United States Patent
Gurvich et al.

(10) Patent No.: US 12,179,913 B2
(45) Date of Patent: Dec. 31, 2024

(54) BALLISTIC RESISTANT DRIVE SHAFT

(71) Applicant: Hamilton Sundstrand Corporation, Charlotte, NC (US)

(72) Inventors: Mark R. Gurvich, Middletown, CT (US); Georgios S. Zafiris, Glastonbury, CT (US); Edward P. Marron, Syracuse, NY (US); Brayton Reed, Rome, NY (US); Joyel M. Schaefer, Earlville, NY (US); Michael King, Sauquoit, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1854 days.

(21) Appl. No.: 16/111,352

(22) Filed: Aug. 24, 2018

(65) Prior Publication Data

US 2020/0063788 A1  Feb. 27, 2020

(51) Int. Cl.
*B64C 27/14* (2006.01)
*B29C 70/30* (2006.01)
*B64D 35/00* (2006.01)
*F16C 3/02* (2006.01)

(52) U.S. Cl.
CPC .............. *B64C 27/14* (2013.01); *B29C 70/30* (2013.01); *B64D 35/00* (2013.01); *F16C 3/026* (2013.01); *F16C 2326/06* (2013.01); *F16C 2326/43* (2013.01)

(58) Field of Classification Search
CPC ...... F16C 3/026; F16C 3/023; F16C 2326/06; F16C 2326/43
USPC ........................................ 464/181, 182, 183
See application file for complete search history.

(56) References Cited

U.S. PATENT DOCUMENTS

| | | | |
|---|---|---|---|
| 4,248,062 A | 2/1981 | McLain et al. | |
| 6,974,555 B2 | 12/2005 | Holemans et al. | |
| 8,118,064 B2 * | 2/2012 | Nakajima | F16C 3/026 |
| | | | 138/153 |
| 8,394,473 B2 | 3/2013 | McCrea et al. | |
| 8,529,361 B2 | 9/2013 | Hechler-Stabbert et al. | |
| 8,876,614 B2 | 11/2014 | Nakamura et al. | |
| 9,920,786 B2 | 3/2018 | Schneider et al. | |
| 10,012,263 B2 * | 7/2018 | Tremelling | F16C 32/048 |
| 10,247,273 B2 * | 4/2019 | Bremmer | B32B 1/08 |
| 2003/0060295 A1 | 3/2003 | Myers et al. | |

(Continued)

FOREIGN PATENT DOCUMENTS

| | | |
|---|---|---|
| DE | 102009036509 | 4/2011 |
| GB | 2149061 | 6/1985 |

OTHER PUBLICATIONS

English translation of CN 104866663 A, Li et al., May 16, 2015 (Year: 2015).*

(Continued)

*Primary Examiner* — Amber R Anderson
(74) *Attorney, Agent, or Firm* — Carlson, Gaskey & Olds, P.C.

(57) ABSTRACT

A drive shaft for an aircraft according to an example of the present disclosure includes, among other things, an elongated core extending between a pair of opposed couplings, an energy absorption layer made of a composite comprising metal, the energy absorption layer disposed on the core, and a first composite ballistic layer disposed along a length of the core.

20 Claims, 6 Drawing Sheets

(56) References Cited

U.S. PATENT DOCUMENTS

| | | | |
|---|---|---|---|
| 2004/0082394 A1* | 4/2004 | Lee | F16C 3/026 |
| | | | 464/182 |
| 2012/0094777 A1* | 4/2012 | Hechler-Stabbert | F02C 7/275 |
| | | | 464/183 |
| 2014/0141894 A1* | 5/2014 | Freund | F01D 5/06 |
| | | | 464/181 |
| 2016/0027192 A1 | 9/2016 | Kendrick | |
| 2017/0058990 A1 | 3/2017 | Bremmer et al. | |
| 2017/0082137 A1* | 3/2017 | Narayanan Nampy | |
| | | | B64C 27/10 |

OTHER PUBLICATIONS

European Search Report for European Patent Application No. 19193461.1 completed Jan. 23, 2020.
Krammer, M. (2018). CH-53K tail drive system live fire test & evaluation. JASP Online Journal. Retrieved Jul. 16, 2018 from: http://jasp-online.org/asjournal/spring-2018/ch-53k-tail-drive-system-live-fire-test-evaluation/.

* cited by examiner

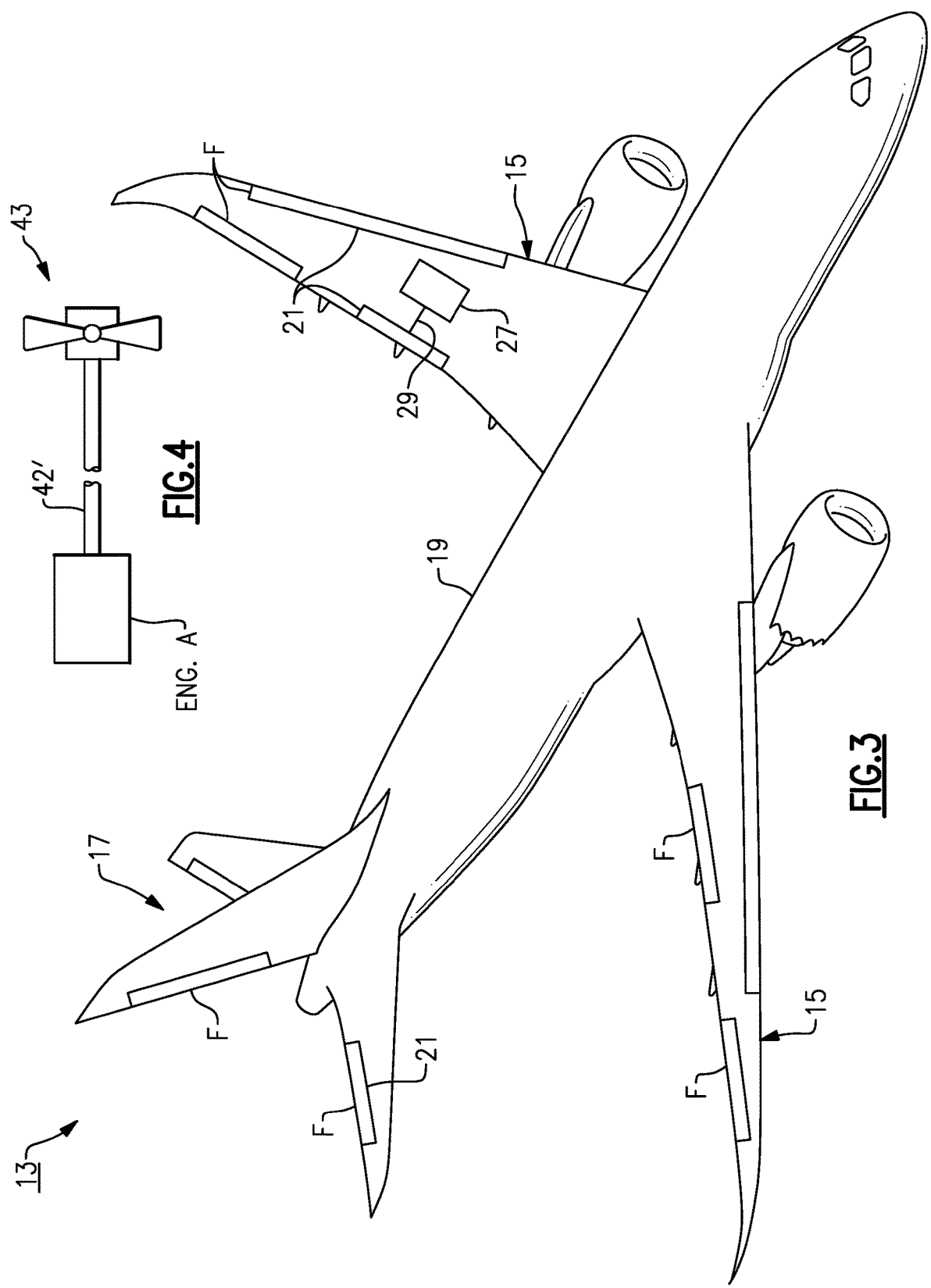

BALLISTIC RESISTANT DRIVE SHAFT

BACKGROUND

This disclosure relates to power transmission systems, and particularly to drive shafts for driving one or more components.

Aircraft typically include one or more drive shafts that interconnect a powerplant system with one or more aircraft components. Example aircraft components can include tail and main rotor blades to provide propulsion. Other aircraft components can include one or more pivotable flaps to manoeuvre the aircraft. During operation, the aircraft may experience ballistic threats such as surface-to-air and air-to-air munitions including projectiles, or in general impact by foreign objects, for example tools, runway debris, etc., which may strike the drive shafts. Similarly, damages during operation can be expected due to service (e.g., debris), installation, transportation and other impacts.

SUMMARY

A drive shaft for an aircraft according to an example of the present disclosure includes an elongated core extending between a pair of opposed couplings, an energy absorption layer made of a composite comprising metal, the energy absorption layer disposed on the core, and a first composite ballistic layer disposed on the core.

A power transmission system for an aircraft according to an example of the present disclosure includes a gearbox and a drive shaft. The drive shaft includes a first coupling coupled to an engine, a second coupling coupled to the gearbox, and a tubular core interconnecting the first and second couplings. An energy absorption layer is made of a composite comprising metal. The energy absorption layer is disposed on the core. A first composite ballistic layer is disposed on the energy absorption layer.

A method of fabricating a drive shaft for an aircraft according to an example of the present disclosure includes forming an energy absorption layer on an elongated core, the elongated core extending between first and second couplings, and the energy absorption layer comprising metal. The method includes the step of forming a first composite ballistic layer on the energy absorption layer.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 illustrates another exemplary aircraft.
FIG. 4 illustrates a fan assembly for an aircraft.

DETAILED DESCRIPTION

Figure 1:
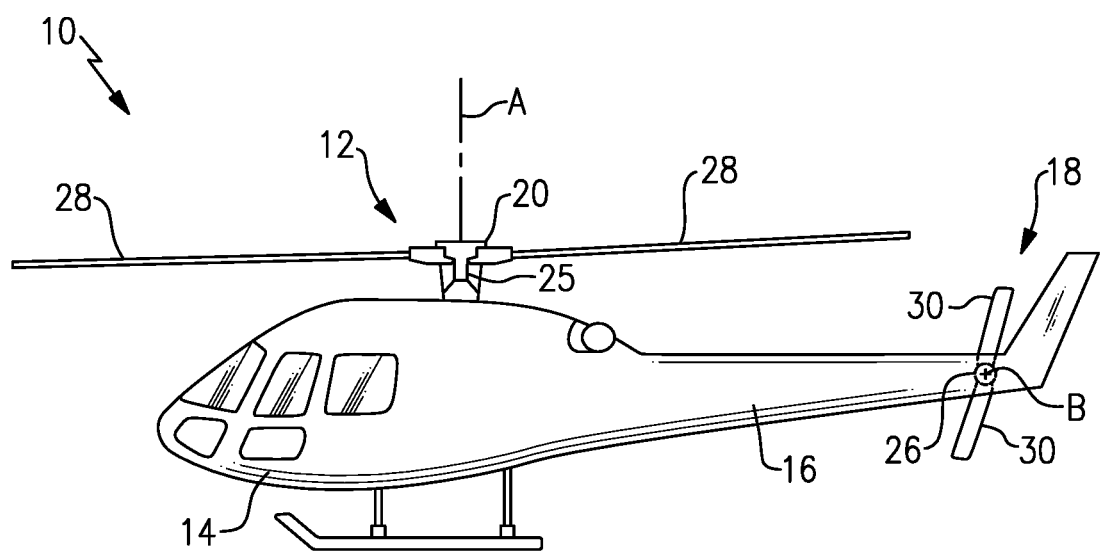
FIG. 1 illustrates an exemplary aircraft.
Figure 2:
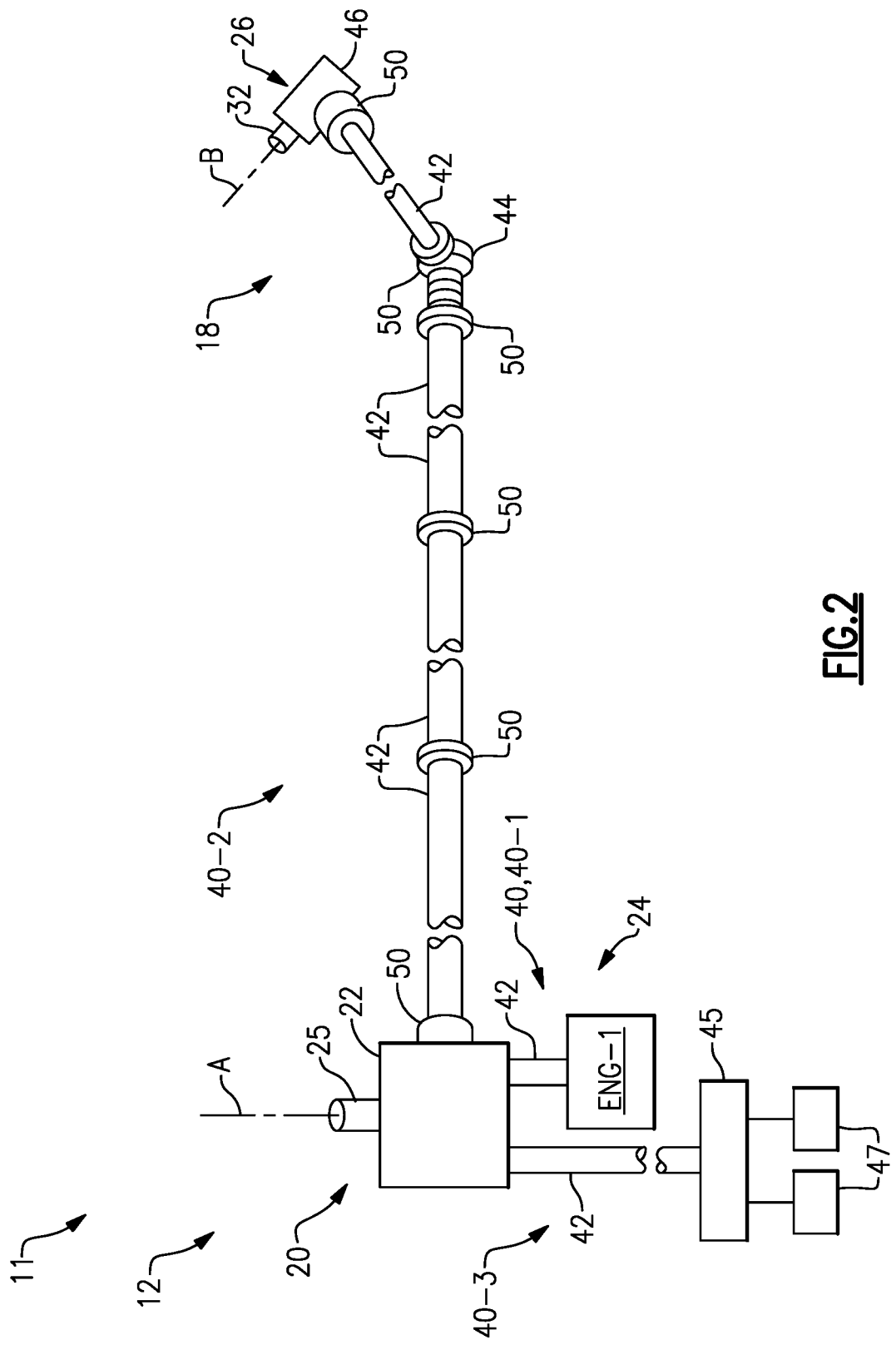
FIG. 2 is a perspective view of an exemplary power transmission system for an aircraft.

FIG. 1 illustrates an exemplary aircraft 10. In the illustrated example of FIG. 1, the aircraft 10 is a rotary-wing aircraft. FIG. 2 illustrates an exemplary power transmission system 11 which can be incorporated into the aircraft 10 of FIG. 1.

Referring to FIGS. 1 and 2, the aircraft 10 includes a main rotor assembly 12 supported by an airframe 14. The airframe 14 includes an extending tail 16 which mounts a tail rotor assembly 18. The main rotor assembly 12 includes a main rotor 20 driven about a first axis of rotation A through a main rotor gearbox 22 by a powerplant system 24.

The powerplant system 24 generates power available for flight operations. The power plant system 24 includes one or more engine packages to drive a main rotor hub 25 of the main rotor 20 and a tail rotor 26 of the tail rotor assembly 18. In the illustrated example of FIG. 2, the powerplant system 24 includes at least one engine package ENG1. In other examples, the powerplant system 24 includes two or more engine packages. Each engine package ENG1 can include a gas turbine engine. Gas turbine engines are known and include a combustor and one or more rotatable spools. Each spool can include a turbine driving a compressor and/or an output of the engine.

The main rotor 20 includes a plurality of rotor blades 28 mounted or otherwise secured to the main rotor hub 25. The rotor blades 28 are rotatable about the first axis of rotation A to provide propulsion for the aircraft 10. The tail rotor 26 includes a plurality of rotor blades 30 mounted or otherwise secured to a tail rotor hub 32. The rotor blades 30 are rotatable about a second axis of rotation B to counteract torque generated by rotation of the rotor blades 28.

Although a particular rotary-wing aircraft configuration is illustrated and described in the disclosed embodiment of FIGS. 1 and 2, other configurations such as vertical-lift fan, turbo-prop, tilt-rotor, tilt-wing and fixed-wing aircraft and other systems including wind turbines, industrial power machinery and shipboard couplings can also benefit from the teachings herein.

For example, FIG. 3 illustrates an aircraft 13 according to an example. The aircraft 13 includes a pair of wings 15 and a tail section 17 that extend from a fuselage 19. The aircraft 13 includes one or more mechanical loads 21. The mechanical loads 21 can include one or more moveable surfaces such as pivotable flaps F. The pivotable flaps F can be located along a portion of one or more of the wings 15 and/or the tail section 17 to augment control of the aircraft 13. Example flaps include ailerons, elevators, rudders, spoilers, leading edge flaps and slats, and components of landing gear assemblies. Each mechanical load 21 can be moved by an actuator 27 interconnected with the mechanical load 21 by a drive shaft or linkage 29 (one actuator and linkage shown in FIG. 3 for illustrative purposes).

Referring back to FIG. 2, with continued reference to FIG. 1, the power transmission system 11 can include one or more drive assemblies to interconnect the powerplant system 24 and the rotors 20, 26. The power transmission system 11 includes one or more drive assemblies 40, including drive assemblies 40-1 to 40-3.

Each drive assembly 40 includes one or more drive shafts 42. In the illustrated example of FIG. 2, drive shaft 42 of drive assembly 40-1 couple the engine package ENG1 to the main rotor gearbox 22.

Drive assembly 40-2 interconnects the powerplant system 24 and the tail rotor 26. Drive assembly 40-2 includes a plurality of drive shafts 42 that couple the main rotor gearbox 22 to an intermediate gearbox 44 and a tail gearbox 46 to drive the tail rotor 26. Gearboxes 44, 46 drive the respective rotor blades 30 in response to torque communicated by the engine package ENG1.

Each drive shaft 42 can include one more couplings 50. Each coupling 50 can be a portion of another aircraft component such as a bearing hanger or gearbox, for example. Each coupling 50 can be mechanically attached or otherwise secure the drive shaft 42 to other portions of the power transmission system 11, such as adjacent drive shafts 42, gearboxes 22, 44, 46 and engine package ENG1. Each gearbox 22, 44, 46 is operable to change a speed and torque of an input to the gearbox 22, 24, 46, and can include an epicyclic gear arrangement having a set of gears, for example.

The drive shafts 42 can interconnect or otherwise couple other portions of the aircraft 10. For example, the power transmission system 11 can include an accessory gearbox 45 that drives one or more aircraft components or accessories 47. Drive assembly 40-3 includes at least one drive shaft 42 that serves as a power takeoff (PTO) shaft to interconnect the accessory gearbox 45 and powerplant system 24. Example accessories include starters, generators, hydraulic and fuel pumps and environmental control systems.

In another example, FIG. 4 illustrates a drive shaft 42' that couples engine ENG A and a fan assembly 43. The fan assembly 43 can be a vertical lift fan incorporated into a fixed wing aircraft that includes one or more other engines to provide forward propulsion, for example.

Figure 5A:
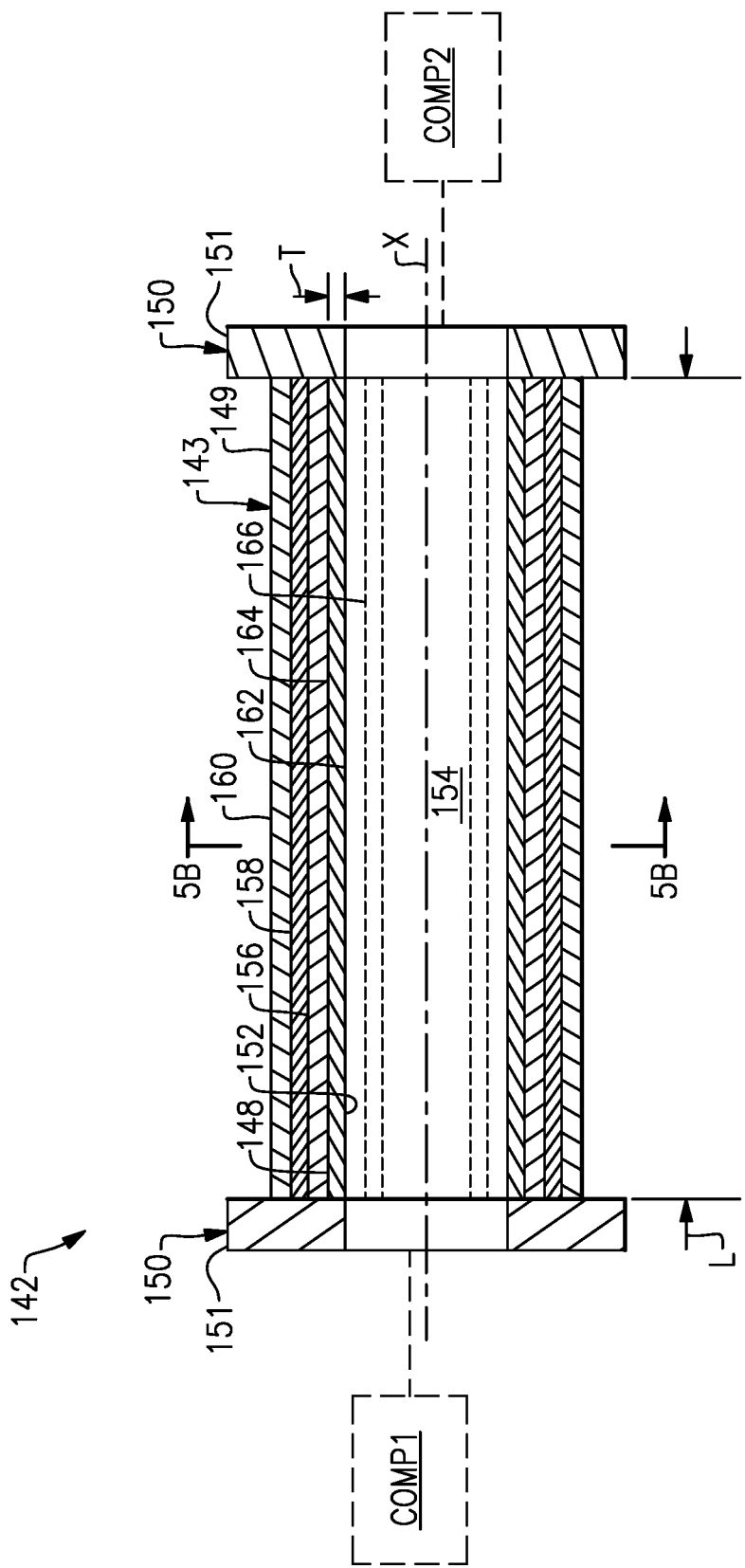
FIG. 5A illustrates a sectional view of a drive shaft.
Figure 5B:
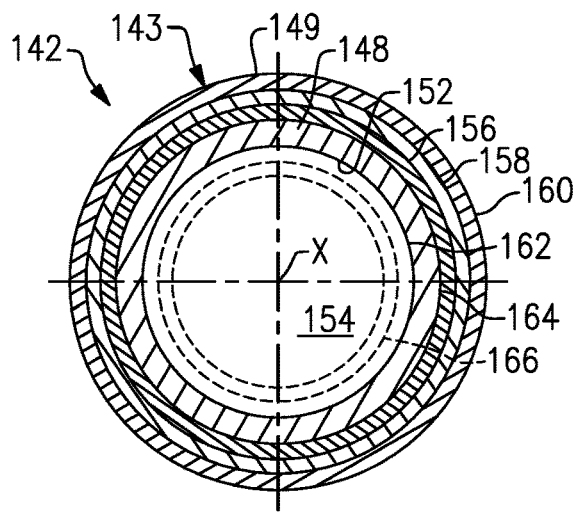
FIG. 5B illustrates a cross-sectional view of the drive shaft along section 5B-5B of FIG. 5A.
Figure 6:
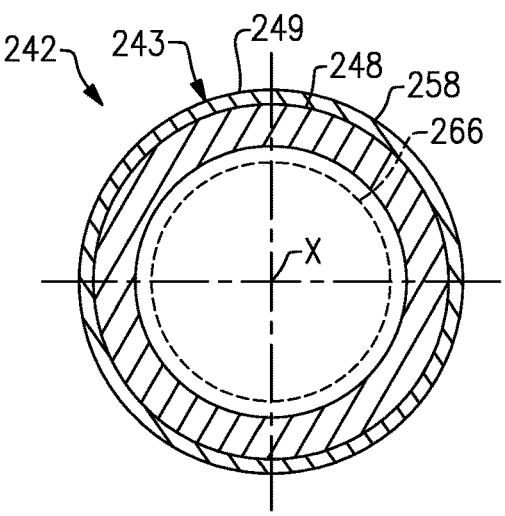
FIG. 6 illustrates a drive shaft according to another example.
Figure 7:
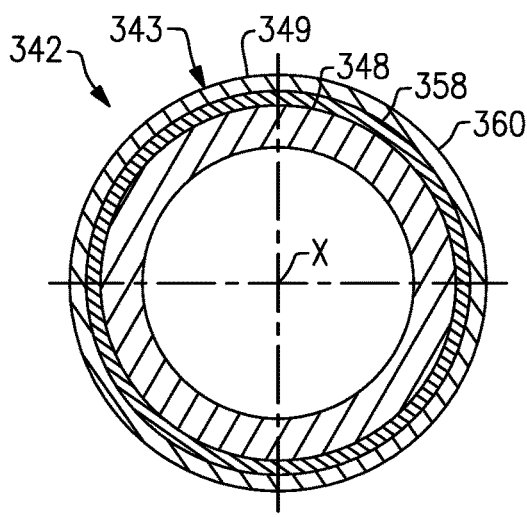
FIG. 7 illustrates a drive shaft according to yet another example.
Figure 8:
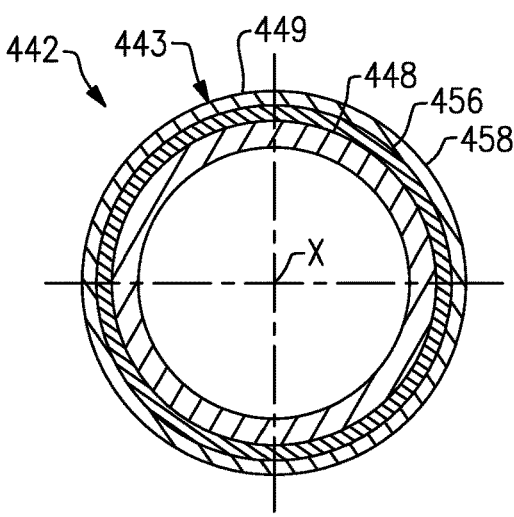
FIG. 8 illustrates a drive shaft according to an example.
Figure 9:
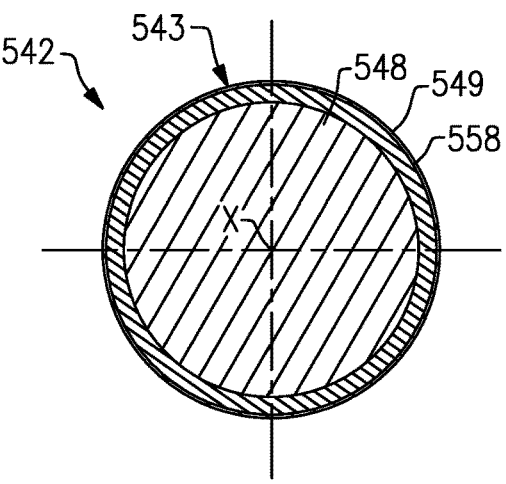
FIG. 9 illustrates a drive shaft according to another example.

FIGS. 5A and 5B illustrate an exemplary drive shaft 142 that interconnects or otherwise couples adjacent components COMP1, COMP2 (shown in dashed lines for illustrative purposes). Components COMP1, COMP2 can include any aircraft components disclosed herein or portions thereof. The drive shaft 142 can be incorporated into a portion of one of the drive assemblies 40 or another portion of the aircraft 10, or can be incorporated into a portion of aircraft 13. In an example, the drive shaft 142 is a linkage 29 coupled to an actuator 27 to drive a pivotable flap F or moveable surface of the aircraft 13. In this disclosure, like reference numerals designate like elements where appropriate and reference numerals with the addition of one-hundred or multiples thereof designate modified elements that are understood to incorporate the same features and benefits of the corresponding original elements.

The drive shaft 142 can accommodate full speed and torque from the main rotor gearbox 22. The drive shaft 142 includes a shaft section 143 and a pair of opposed input and output attachment portions 151 that can be incorporated into respective couplings 150, such as the couplings 50 of FIG. 2. The construction and/or geometry of the input and output attachment portions 151 may be the same or may differ, and can be axisymmetric or non-axisymmetric with respect to each other. The shaft section 143 includes an elongated core 148 that extends along a longitudinal axis X between the attachment portions 151. The core 148 is load-bearing and interconnects the attachment portions 151 to transfer torque there between as well as other load components such as, for example, bending moments and axial load. A formulation of the core 148, including material and/or fiber construction, can be selected to provide a predetermined rigidity, strength and stability, defined as resistance to local and/or global buckling. The core 148 can be a metallic core or made of a composite fiber reinforced polymer, for example.

In the illustrated example of FIGS. 5A and 5B, the core 148 is an elongated, thin walled hollow tube that can be dimensioned to reduce weight of the drive shaft 142. A cross-section of the tube can be either constant or variable along the tube length. The following FIGS. 5-10 illustrate the proposed invention on example of tubes with constant cross-sections for demonstration purposes. The core 148 includes an inner diameter 152 defining an elongated bore 154 that extends between the attachment portions 151. The core 148 extends a length L. An outer diameter 164 of the core and the inner diameter 152 establish a thickness T of a wall of the core 148. In examples, the thickness T is less than about 25% of the length L and/or less than about 40% of the outer diameter 164. For the purposes of this disclosure, the term "about" means±3% of the disclosed value unless otherwise stated. In other examples, the thickness T is equal to or greater than about 25% of the length L and/or equal to or greater than about 40% of the outer diameter 164.

The core 148 is mechanically attached or otherwise secured to each of the attachment portions 151. In the illustrated example of FIG. 5A, the attachment portions 151 are outwardly extending mounting flanges that are mechanically attached to end portions of the core 148. In other examples, the core 148 is integrally formed with the attachment portions 151. In some examples, each of the attachment portions 151 is a flexible coupling (or portion thereof) having a lesser bending stiffness than the core 148. Each flexible coupling can include one or more portions that deflect relative to the core 148 in response to application of torque or other load components, such as, for example, bending moment and axial loads. One would understand how to configure the flexible coupling in view of the teachings disclosed herein.

Upon applied load, both the core 148 and the attachment portions 151 can be expected to deform. Since the attachment portions 151 can possess lower bending stiffness than the core 148, overall bending deformation can be expected to be primarily controlled be bending deformation of the attachment portions 151.

Various materials can be utilized to form the shaft section 143 and attachment portions 151. In some examples, the core 148 and/or attachment portions 151 comprise metal. Example metal materials include aluminum, aluminum alloys, titanium, titanium alloys and steel alloys. In other examples, the core 148 and/or attachment portions 151 are made of a fiber-reinforced polymer-matrix based composite material including any of the fibers and polymer matrices disclosed herein. Examples of fibers may include carbon, glass, and organic fibers. Examples of polymer matrix may include different variants of thermosets and/or thermoplastic polymers.

In some examples, the drive shaft 142 is a "hybrid" drive shaft. For example, the attachment portions 151 can be made of a metal material or a composite or other non-metal material or combinations thereof, and the shaft section 143 includes one or more layers of fiber-reinforced polymer-matrix composite or non-metal material material(s) overlaying or otherwise disposed on the core 148. The core 148 of the hybrid drive shaft can be made of a metal or composite material.

During operation of the aircraft, the drive shaft may experience one or more ballistic and impact service events. Example ballistic events include damage to the drive shaft caused by munitions fire that strikes the drive shaft. Impact service events can include contact to the drive shaft during transportation of the aircraft and installation due to dropped tooling, for example. The ballistic and impact service events may impact the structural integrity of the drive shaft. For example, laminated composite materials can be sensitive to physical impacts due to being relatively weak in the transversal (i.e., through thickness) direction.

The drive shaft 142 is constructed from multiple layers of material to eliminate or otherwise reduce damage caused by ballistic and service impacts. The shaft section 143 includes one or more layers of material disposed on the core 148. The layers shown in FIGS. 5-10 may cover either the entire length or contact area of the shaft 142 or its part. Each individual layer can cover different lengths or contact areas of the shaft 142. In the illustrated example of FIGS. 5A and 5B, the drive shaft 142 includes an overwrap 149 that extends along the axis X to define an exterior of the shaft section 143. The overwrap 149 can include at least an energy absorption layer 156, a first ballistic layer 158 and an erosion protection layer 160.

The first ballistic layer 158 can be disposed along an outer diameter 164 of the core 148. The energy absorption layer 156 can be disposed on the outer diameter 164 of the core 148. The first ballistic layer 158 can be disposed on the energy absorption layer 156. The erosion protection layer 160 can be disposed on the first ballistic layer 158 to define external surfaces of the drive shaft 142.

The drive shaft 142 can include a second ballistic layer 166 (shown in dashed lines). The second ballistic layer 166 can be disposed along the inner diameter 152 of the core 148. Forming the second ballistic layer 166 along the inner diameter 152 of the core 148 can reduce a likelihood that munitions that enter through one side of the shaft section 143 penetrate through and exit an opposite side of the shaft section 143.

Each of the layers 156, 158, 160, 162, 166 can include one or sublayers of material formed to provide a predetermined thickness. It should be appreciated that one or more of the layers 156, 158, 160, 162, 166 can be duplicated, omitted and/or rearranged relative to each other and/or the core 148.

The first and/or second ballistic layers 158, 166 are disposed along a length of the core 148. Each of the ballistic layers 158, 166 can be a composite ballistic layer made of a fiber-reinforced polymer-matrix composite material. Example composite materials include fiber-reinforced composites, such as organic fibers in a matrix. Example organic fibers include aramid fibers sold under the trade names Kevlar® and Nomex® and ultra-high-molecular-weight (UHMW) polyethylene fibers such as, for example, Dyneema® and Spectra®. The fibers can be filament wound, wrapped, woven or braided, for example, at predetermined fiber orientations to provide a predetermined rigidity. Other methods of composite fabrications such as fiber/tape placing can be used as well if compatible with specific types of selected polymers and fibers. The fibers can be arranged in multiple orientations to improve impact absorption, including alternating fiber orientation layers, woven fiber fabrics, matts and pre-impregnated fibers (prepregs), and combinations of thereof. Fiber orientations in the layers may include, for example, the axial orientation, parallel to axis X (defined as 0 orientation), the hoop orientation (defined as 90 degree orientation), orientation at non-zero angle ALFA within 10 and 80 degrees with respect to 0 orientation, coupled orientation in two directions +ALFA and −ALFA respectively, or any of their combinations.

The energy absorption layer 156 can be constructed to absorb various types of energy communicated to the drive shaft 142. The energy absorption layer 156 can be constructed to absorb or dampen vibrational frequencies from the aircraft platform or impact energy from ballistic events, for example. In another example, the drive shaft 142 may be subject to energy power strikes, energy pulses from laser beams, and energy in the radio frequency spectrum. The material of the energy absorption layer 156 can be selected with respect to at least one predetermined energy frequency and/or level or range of frequencies and/or levels to absorb or dampen expected impact energy, velocity of impactors (e.g., munition, debris, dropped tools) and their shapes, for example.

The energy absorption layer 156 can comprise metal, non-metallic materials, or combination thereof. For example, the energy absorption layer 156 can be made of a composite material including metal particles, fibers, components or ingredients. Example metal particles or fibers include copper and copper alloys. In some examples, the energy absorption layer 156 is made of a fiber-reinforced polymer matrix composite (PMC) with a metallic matt.

In some examples, the energy absorption layer 156 can provide conductivity for dissipating static electricity that may accumulate on the drive shaft 142. In examples, the attachment portions 151 are made of a metal material, and the energy absorption layer 156 is arranged to establish an electrical path between the attachment portions 151 to dissipate the energy. In some examples, energy absorption layer 156 include continuous metal (e.g. copper, aluminum, nickel) mesh in a polymer matrix. The energy absorption layer 156 can be constructed to dissipate other forms of energy, such as different spectrums of electromagnetic radiation. The energy absorption layer 156 can include organic or inorganic chemicals. Examples include loadings of metal particles (e.g. nickel, iron, aluminum, silver), metal and mixed metal oxides particles (e.g. ferrites), carbon black or graphite particles in the polymer matrix of the energy absorption layer 156. Any combination of above material, meshes and loading methods can be used to tailor the functionality of the energy absorption layer 156.

The drive shaft 142 can include a second energy absorption layer 162 (shown in dashed lines) along the inner diameter 152 of the core 148. The second energy absorption layer 162 can include any of the materials and construction techniques disclosed herein for the energy absorption layer 156. The second energy absorption layer 162 can serve as an inner conductive layer to dissipate static electricity to the attachment portions 151.

Various techniques can be utilized to form the core 148 and ballistic layers 158, 166. The layers disclosed herein can be formed on the inner and/or outer diameters 152, 164 of the core 148, with the core 148 being made of metal.

For polymer matrix composite cores, the core 148 can be constructed using thermoset, or thermoplastic polymers and any of the fiber-reinforced composite materials disclosed herein. The ballistic layers 158, 166 can be fabricated by filament winding, wrapping, fiber or tape placement or braiding, for example. The ballistic layers 158, 166 can include thermoset resin which is co-cured or thermoplastic resin which is solidified together with the core 148, depending on whether the latter is thermoset polymer or thermoplastic polymer based, respectively. The ballistic layers 158, 166 can be formed on the respective energy absorption layers 156, 162 or directly on the inner and outer diameters 152, 164 of the core 148.

The erosion protection layer 160 can be formed after the core 148 and ballistic layers 158, 166 are cured or solidified. The ballistic layers 158, 166 can be bonded to the inner and outer diameters 152, 164 of the core 148 or an intermediate layer to limit relative movement of the ballistic layers 158, 166 relative to the core 148.

The erosion protection layer 160 is a non-load bearing, sacrificial layer that serves to protect the layers 156, 158, 162, 166 and core 148. The erosion protection layer 160 can be formed on the outer diameter 164 of the core 148. Materials of the erosion protection layer 160 can be selected to provide wear resistance and improved slippage to reduce sand erosion, for example. The erosion protection layer 160 can be a coating made of a polymer such as a rubber or silicone, or epoxies or polyurethane material, or combination thereof, and can include additives such as titanium dioxide. In some examples, the energy absorption layer 156 and the erosion protection layer 160 are combined into a single layer.

Various techniques can be utilized to form the energy absorption layers 156, 162 and erosion protection layer 160, including painting, spray painting, roller painting, deposition with an applicator and wrapping, or fabric, matt, mesh and prepregs layups and polymer resin application. Temperature and/or pressure can be applied to form the layers 156, 160, 162.

One or more of the layers of FIGS. 5A and 5B can be omitted or rearranged relative to the core. In the illustrated example of FIG. 6, drive shaft 242 includes core 248 and ballistic layers 258, 266 that define internal and external surfaces of the drive shaft 242. In the illustrated example of FIG. 7, drive shaft 342 includes core 348, ballistic layer 358 and erosion protection layer 360 that defines external surfaces of the drive shaft 342. In the illustrated example of FIG. 8, drive shaft 442 includes core 448, energy absorption layer 456 and ballistic layer 458 that defines external surfaces of the drive shaft 442. In the illustrated example of FIG. 9, drive shaft 542 includes a core 548 and ballistic layer 558. The core 548 is solid or otherwise substantially free of a hollow interior. In the example drive shafts 142/242/342/442/542 disclosed in FIGS. 5A-9, the layer(s) covering the core 148/248/348/448/548 can cover either an entire external length of the core 148/248/348/448/548 or cover it partially. Similarly, in the hoop direction, the layer(s) can cover a portion or the entire 360 degree perimeter of the core 148/248/348/448/548.

Figure 10:
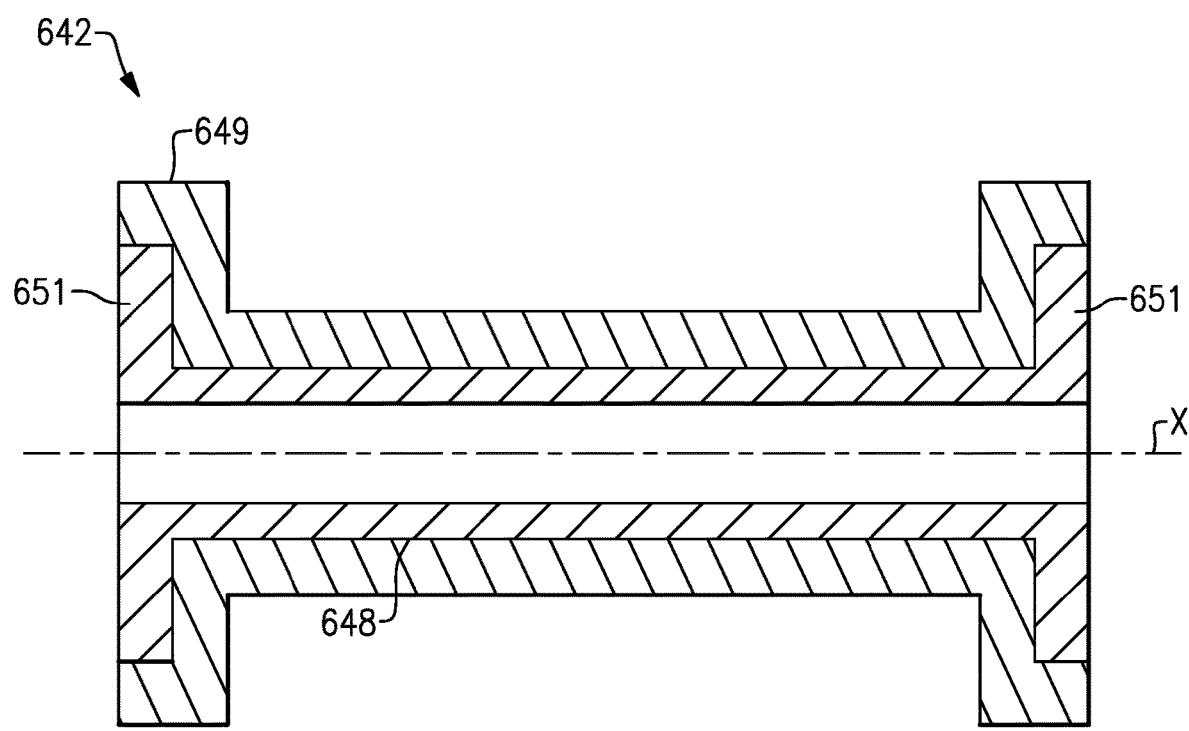
FIG. 10 illustrates a drive shaft according to yet another example.

FIG. 10 illustrates a drive shaft 642 according to another example. The drive shaft 642 includes overwrap 649 that extends about core 648 and at least portions of attachment portions 651. The overwrap 649 can include any of the layers disclosed herein. The core 648 and attachment portions 651 can be integrally formed from a thermoplastic polymer, for example. Fibers of the overwrap 649 can be arranged at a different orientation than fibers of the core 648 and attachment portions 651. The core and layers in the example drive shafts 142/242/342/442/542/642 can include any of the materials and constructions disclosed herein.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A drive shaft for an aircraft comprising:
an elongated core extending between a pair of opposed attachment portions, wherein each of the pair of opposed attachment portions is a flexible coupling having a lesser stiffness than the core, and the core is a tube including an inner diameter defining an elongated bore that extends between the pair of opposed attachment portions;
an energy absorption layer made of a composite comprising metal, the energy absorption layer disposed on the outer diameter of the core; and
a first composite ballistic layer disposed on the energy absorption layer.

2. The drive shaft as recited in claim 1, wherein the first composite ballistic layer comprises organic fibers.

3. The drive shaft as recited in claim 2, wherein the core comprises metal.

4. The drive shaft as recited in claim 2, wherein the core is made of a composite material.

5. The drive shaft as recited in claim 1, further comprising a second composite ballistic layer disposed on the inner diameter.

6. The drive shaft as recited in claim 1, wherein each attachment portion of the pair of opposed attachment portions comprises metal.

7. The drive shaft as recited in claim 6, wherein the energy absorption layer is arranged to establish an electrical path between the pair of attachment portions.

8. The drive shaft as recited in claim 7, further comprising:
a second composite ballistic layer disposed on the inner diameter of the core;
wherein the core is made of a composite material; and
wherein a thickness of the core is established between the inner diameter and the outer diameter of the core, the core extends a length between the pair of opposed attachment portions, and the thickness is less than 25% of the length, and the thickness is less than 40% of the outer diameter of the core.

9. The drive shaft as recited in claim 1, wherein each of the pair of opposed attachment portions has a lesser stiffness than the core.

10. The drive shaft as recited in claim 1, further comprising an erosion protection layer made of a polymer, the erosion protection layer disposed on the first composite ballistic layer.

11. A power transmission system for an aircraft comprising:
a gearbox; and
a drive shaft comprising:
a first attachment portion coupled to an engine;
a second attachment portion coupled to the gearbox;
a tubular core interconnecting the first and second attachment portions, an energy absorption layer made of a composite comprising metal, the energy absorption layer disposed on an outer diameter of the core, and a first composite ballistic layer disposed on the energy absorption layer, wherein each of the first and second attachment portions is a flexible coupling having a lesser stiffness than the tubular core, and the tubular core includes an inner diameter defining an elongated bore that extends between the first and second attachment portions.

12. The power transmission system as recited in claim 11, further comprising a second composite ballistic layer disposed on the inner diameter of the tubular core.

13. The power transmission system as recited in claim 11, wherein the gearbox drives one or more rotor blades.

14. The power transmission system as recited in claim 11, wherein the gearbox is an accessory gearbox that drives one or more accessories.

15. The power transmission system as recited in claim 14, wherein the one or more accessories include a starter, a generator, a hydraulic pump, a fuel pump and/or an environmental control system.

16. The power transmission system as recited in claim 11, wherein the energy absorption layer is arranged to establish an electrical path between the first and second attachment portions.

17. The power transmission system as recited in claim 16, further comprising a second composite ballistic layer disposed on the inner diameter of the tubular core.

18. A method of fabricating a drive shaft for an aircraft comprising:
   forming an energy absorption layer on an outer diameter of an elongated core, the elongated core extending between first and second attachment portions, wherein the core is a hollow tube including an inner diameter defining an elongated bore extending between the first and second attachment portions, each of the first and second attachment portions is a flexible coupling having a lesser stiffness than the core, and the energy absorption layer comprises a material selected with respect to at least one predetermined energy frequency or at least one predetermined energy level; and
   forming a first composite ballistic layer on the energy absorption layer.

19. The method as recited in claim 18, wherein the first composite ballistic layer comprises organic fibers.

20. The method as recited in claim 18, further comprising forming a second composite ballistic layer on the inner diameter of the hollow tube.

\* \* \* \* \*